US012384868B2

(12) United States Patent
Olsson Karlberg et al.

(10) Patent No.: US 12,384,868 B2
(45) Date of Patent: Aug. 12, 2025

(54) ALKOXYSILANE FUNCTIONAL POLYURETHANE-UREA FOR ADHESIVE OR COATING

(71) Applicant: AKZO NOBEL COATINGS INTERNATIONAL B.V., Amsterdam (NL)

(72) Inventors: Nils Gustav Martin Olsson Karlberg, Amsterdam (NL); Peter Andreas Plikk, Amsterdam (NL); Keimpe Jan Van Den Berg, Amsterdam (NL); Hendrica Petronella Maria Verlaan-Hooft, Amsterdam (NL); Bereket Zewoldi Yebio, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 621 days.

(21) Appl. No.: 17/796,318

(22) PCT Filed: Feb. 26, 2021

(86) PCT No.: PCT/EP2021/025077
§ 371 (c)(1),
(2) Date: Jul. 29, 2022

(87) PCT Pub. No.: WO2021/170297
PCT Pub. Date: Sep. 2, 2021

(65) Prior Publication Data
US 2023/0137284 A1    May 4, 2023

(30) Foreign Application Priority Data

Feb. 26, 2020 (EP) .................... 20159560
Jun. 24, 2020 (EP) .................... 20181847

(51) Int. Cl.
*C08G 18/38* (2006.01)
*C09D 175/08* (2006.01)
*C09J 175/08* (2006.01)

(52) U.S. Cl.
CPC ....... *C08G 18/3893* (2013.01); *C09D 175/08* (2013.01); *C09J 175/08* (2013.01); *C08G 18/3863* (2013.01); *C08G 2150/00* (2013.01); *C08G 2170/00* (2013.01)

(58) Field of Classification Search
CPC ................................. C08G 18/3893
See application file for complete search history.

(56) References Cited

U.S. PATENT DOCUMENTS

| 4,067,844 A | 1/1978 | Barron et al. | |
| 7,115,696 B2 * | 10/2006 | Roesler | C08G 18/4866 |
| | | | 528/33 |
| 7,718,730 B2 * | 5/2010 | Roesler | C08G 18/10 |
| | | | 524/840 |
| 2005/0137324 A1 | 6/2005 | Roesler et al. | |
| 2006/0173140 A1 * | 8/2006 | Roesler | C09J 175/08 |
| | | | 525/474 |
| 2009/0226740 A1 | 9/2009 | Teysseire | |
| 2009/0264602 A1 | 10/2009 | Mori et al. | |
| 2010/0043945 A1 | 2/2010 | Dohner et al. | |
| 2010/0204384 A1 | 8/2010 | Huang et al. | |
| 2010/0323203 A1 | 12/2010 | Huck | |
| 2011/0046305 A1 | 2/2011 | Schubert et al. | |
| 2011/0151250 A1 | 6/2011 | Yasuda et al. | |
| 2011/0190420 A1 * | 8/2011 | Nagelsdiek | C08G 18/718 |
| | | | 523/400 |
| 2013/0237616 A1 | 9/2013 | Ferenz et al. | |
| 2017/0292050 A1 * | 10/2017 | Burckhardt | C08K 5/548 |
| 2022/0185949 A1 * | 6/2022 | Lee | C08K 5/372 |

FOREIGN PATENT DOCUMENTS

EP    3026091 A1    6/2016

OTHER PUBLICATIONS

"International Preliminary Report on Patentability," for PCT Application No. PCT/EP2021/025077 mailed Aug. 30, 2022 (5 pages).
Carolina R. L. Hack et al., N-Alkylated Sulfamic Acid Derivatives as Organocatalyst in Multicomponent Synthesis . . . . J. Barz. Chem. Soc., vol. 29, No. 11, pp. 2342-2349.
David Dupont et al., New Metal Extractants and Super-Acidic Ionic Liquids Derived from Sulfarnic Acid, ChemComm, Royal Society of Chemistry, 2016, 52, pp. 7032-7035.
European Search Report of Corresponding Application No. EP20159560.0, dated Sep. 21, 2021.
International Search Report and Written Opinion of Corresponding International Application No. PCT/EP2021/025077, mailed Jun. 30, 2021.

* cited by examiner

*Primary Examiner* — Margaret G Moore
(74) *Attorney, Agent, or Firm* — Pauly, DeVries Smith & Deffner LLC

(57) ABSTRACT

The present disclosure relates to an alkoxysilane functional polyurethane-urea that can be used to prepare an adhesive or coating composition. The polyurethane-urea is obtainable by polymerization of reaction components comprising (a) an alkoxysilane functional thioether diol; (b) a polyisocyanate; and (c) an alkoxysilane functional aspartate ester, wherein the alkoxysilane functional aspartate ester is a Michael addition product of an amino-functional silane and an unsaturated diester. The polyurethane-urea has a low viscosity and can be used in solvent- and water-free adhesives or coatings. The adhesive or coating can be applied to various substrates such as wood, wood-containing composite, metal, plastics, paper, stone, glass or concrete.

14 Claims, No Drawings

ALKOXYSILANE FUNCTIONAL POLYURETHANE-UREA FOR ADHESIVE OR COATING

CROSS-REFERENCE TO RELATED APPLICATIONS

This application is a 35 U.S.C. § 371 national phase application of PCT Application No. PCT/EP2021/025077 (published as WO 2021/170297 A1), filed on Feb. 26, 2021, which claims the benefit of priority to EP Application Serial No. 20159560.0, filed on Feb. 26, 2020, and EP Application Serial No. 20181847.3 filed on Jun. 24, 2020, each of which is incorporated herein by reference in its entirety.

FIELD OF THE INVENTION

The present invention relates to an alkoxysilane functional polyurethane-urea that can be used in an adhesive composition or a coating composition.

BACKGROUND

Glued laminated timber, also called laminated timber beams, glue-laminated beams or glulam, is a structural timber product composed of several layers of dimensioned lumber glued together. By laminating several smaller pieces of wood, a single large, strong, structural member can be manufactured from smaller timbers, for use as ridge beams, garage door headers and floor beams, vertical columns or horizontal beams, often in curved, arching shapes for example. Glued laminated beams are used in a wide range of applications in building construction. Another glued laminated wood product is cross-laminated timber (CLT), which is a wood panel product made from gluing layers of solid-sawn lumber together. Each layer of boards is orientated perpendicular to adjacent layers and glued on the wide faces of each board, usually in a symmetric way so that the outer layers have the same orientation. Regular timber is an anisotropic material, meaning that the physical properties change depending on the direction at which the force is applied. By gluing layers of wood at perpendicular angles, the panel is able to achieve better structural rigidity in both directions. CLT is distinct to glued laminated timber, a product with all laminations orientated in the same way.

Adhesives used in building construction are subject to extensive tests regarding their resistance to extreme indoor and outdoor climatic conditions. They need to meet highly stringent requirements with respect to moisture and heat resistance of the glued product. Exposure to moisture and a high thermal stress causes tensions in the wood due to swelling and shrinkage. This type of applications, with exposure to extreme conditions, requires an adhesive that can provide a superior bond strength even under the above-mentioned climatic conditions.

In load bearing wood applications adhesives based on phenol-resorcinol-formaldehyde (PRF), melamine-formaldehyde (MF) and melamine-urea-formaldehyde (MUF) are widely used. However, there is a growing demand to reduce the use of formaldehyde-containing adhesives due to formaldehyde emissions. It is often desirable that the adhesive does not contain toxic products such as isocyanates or formaldehyde.

It is known to use silane functional resins in isocyanate- and formaldehyde-free wood adhesives. Reference herein to silane functional resins is to resins with alkoxysilane functional groups. Silane functional resins are typically cured by contact with water, which first reacts with the alkoxysilane groups to form a silanol group. Silanol groups are then condensed by reacting with either another silanol group or an alkoxy silane. Often an acidic catalyst is included in the composition to increase the reaction speed.

US 2005/0137324 A1 describes preparation of an alkoxysilane functional polyurethane from (a) the reaction product of a polyol, particularly polyoxypropylene diol in Example 3, and a polyisocyanate with (b) an alkoxysilane functional aspartate ester. The resulting polyurethane is used in the preparation of a two-component adhesive, sealant or coating composition.

The disadvantage of the polyurethane prepared in Example 3 of US 2005/0137324 A1 is insufficient adhesion to wood substrate. Particularly, such adhesive composition failed the dry adhesion test A1 according to European standard EN 302-1:2013 with the test requirements listed in EN 16254:2013. It is therefore expected to fail wet adhesion tests, which involve soaking in water.

It is desired to provide an adhesive composition that is isocyanate- and formaldehyde-free and has superior adhesion compared to the existing wood adhesives. Preferably, the adhesive provides glue joints of sufficiently high strength and good water resistance in order to be qualified for construction applications.

SUMMARY OF THE INVENTION

In order to address the above-mentioned desires, the present invention provides, in a first aspect, an alkoxysilane functional polyurethane-urea, obtainable by polymerization of reaction components comprising:
  (a) an alkoxysilane functional thioether diol;
  (b) a polyisocyanate; and
  (c) an alkoxysilane functional aspartate ester,
    wherein the alkoxysilane functional aspartate ester (c) is a Michael addition product of an amino-functional silane and an unsaturated diester.

In a second aspect, the present invention provides an adhesive composition or a coating composition comprising the polyurethane-urea according to the first aspect of the invention.

In a third aspect, the invention provides a method of bonding a first substrate to a second substrate, comprising applying the adhesive composition according to the second aspect of the invention to at least one surface of the first substrate or the second substrate, and contacting the surface of the first substrate with a surface of the second substrate, where at least one of the contacting surfaces has the adhesive composition applied thereto.

In a fourth aspect, the invention provides a substrate bonded with the adhesive composition or coated with the coating composition according to the second aspect of the invention.

DETAILED DESCRIPTION OF THE INVENTION

The invention is based on a judicious insight that by using a particular alkoxysilane functional polyol in the polyurethane-urea synthesis it is possible to create a polyurethane-urea-containing adhesive composition or coating composition that is characterized by excellent adhesion and strength. Without wishing to be bound by theory, the inventors believe that better adhesion is achieved due to a higher Si content in the polyurethane-urea. Particularly, the Si content in the polyurethane-urea of the present invention can be at least 2.5 wt. %. For comparison, the calculated Si content in the polyurethane of Example 3 of US 2005/0137324 is 0.5%. The Si content can be calculated based on the amounts of the reagents and their Si content.

The polyurethane-urea according to the invention is alkoxysilane functional. It comprises alkoxysilane groups attached to the main chain of the polymer-pendant alkoxysilane groups stemming from the alkoxysilane functional thioether diol (a)- and alkoxysilane groups in any end-capping groups stemming from the alkoxysilane functional aspartate ester (c).

The term polyurethane-urea means a polymer that has both urethane and urea bonds in its polymer chain.

The polyurethane-urea according to the invention is obtainable by polymerization of reaction components comprising (a) an alkoxysilane functional thioether diol, (b) a polyisocyanate and (c) an alkoxysilane functional aspartate ester, i.e. under urethane forming conditions. In the polymerization reaction the hydroxyl groups from the thioether diol react with the isocyanate groups of polyisocyanate to form a polyurethane chain. The polyurethane chain is end-capped with the alkoxysilane functional aspartate ester, through urea bonds.

The alkoxysilane functional thioether diol (a) has two hydroxyl groups per molecule. Preferably, the alkoxysilane groups are attached to a sulphur atom, directly or through a linking group.

The alkoxysilane functional thioether diol (a) preferably has general formula (I):

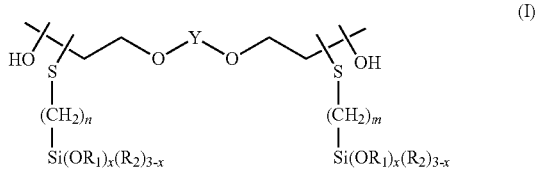

(I)

wherein:
Y is a bifunctional group, preferably a saturated alkylene group or a polyether group,
m and n each are, independently, an integer with a value in the range of from 0 to 10, preferably of from 1 to 4, more preferably 3 or 4,
$R_1$ and $R_2$ each are, independently, a C1-C3 alkyl group, preferably a methyl or an ethyl group,
x is an integer with a value in the range of from 1 to 3, preferably is 2 or 3.

The thioether diols according to general formula (I) are obtainable by reacting an epoxy-difunctional compound with a mercaptoalkyl alkoxysilane.

Preferably, the alkoxysilane functional thioether diol (a) is obtainable by reacting an epoxy-difunctional compound with a mercaptoalkyl alkoxysilane. The epoxy-difunctional compound preferably is an alkanediol diglycidyl ether or ester, more preferably is a diglycidyl ether selected from the group consisting of ethylene glycol diglycidyl ether, diethylene glycol diglycidyl ether, 1,4-butanediol diglycidyl ether, 1,6-hexanediol diglycidyl ether, poly (ethylene glycol) diglycidyl ether, and combinations thereof. In a particular preferred embodiment, the epoxy-difunctional polyether is 1,4-butanediol diglycidyl ether. The epoxy-difunctional compound may be an aromatic or cycloaliphatic diepoxy compound, such as a reaction product of 2,2-bis(4-hydroxy-cyclohexyl)propane with epichlorohydrin (commercially available as Eponex 1510 from PPG); diglycidyl ethers of bisphenol A (e.g. Epikote 828 from Hexion); or 3,4-epoxy-cyclohexylmethyl-3,4-epoxycyclohexanecarboxylate.

Suitable mercaptoalkyl alkoxysilanes can have the following general formula:

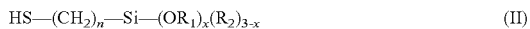

(II)

wherein n is an integer with a value in the range of from 0 to 10, $R_1$ and $R_2$ are, independently, a C1-C3 alkyl group, x is an integer having a value of 1-3. n is preferably 1 to 4, more preferably 3 or 4. $R_1$ and $R_2$ are preferably a methyl or ethyl group.

Preferred mercaptoalkyl alkoxysilanes include (3-mercaptopropyl) triethoxysilane, (3-mercaptopropyl) trimethoxysilane, (4-mercaptobutyl) triethoxysilane, and (4-mercaptobutyl) trimethoxysilane.

The skilled person is able to find suitable reaction conditions for reacting the epoxy groups with the mercaptoalkyl alkoxysilanes. Typically, the reaction is carried out at an elevated temperature, preferably in the range of from 40 to 100° C., more preferably of from 40 to 80° C., and the progress of the reaction is monitored by epoxy titration. Catalysts can be used, particularly amine catalysts, e.g. tris(dimethylaminomethyl)phenol or benzyl dimethylamine.

A particularly preferred alkoxysilane functional thioether diol (a) is an alkoxysilane functional thioether diol obtained by reacting 1,4-butanediol diglycidyl ether with (3-mercaptopropyl) triethoxysilane.

In addition to alkoxysilane functional thioether diol (a), the reaction components may comprise a further diol, preferably a further diol selected from the group consisting of an aliphatic diol, a cycloaliphatic diol, an aromatic diol, a polyether diol, a polyester diol, and any combinations thereof. Examples include ethylene glycol, propylene glycol, 1,3-butanediol, 1,4-butanediol, 1,6-hexanediol, 2-ethyl-1,3-hexanediol, polyethylene glycols, polypropylene glycols. The further diol preferably has a number average molecular weight from 250 to 5,000 g/mole, more preferably from 500 to 1,000 g/mole.

Polyisocyanates are compounds comprising at least two isocyanate groups. Suitable polyisocyanates (b) are for example (cyclo)aliphatic or aromatic polyisocyanates. Suitable polyisocyanates include 4,4'-methylene diphenyl diisocyanate, 2,2'-methylene diphenyl diisocyanate, 2,4'-methylene diphenyl diisocyanate, hexamethylene diisocyanate, 2,2,4- or 2,4,4-trimethyl hexamethylene diisocyanate, p- and m-tetramethyl xylene diisocyanate, methylene bis(4-cyclohexyl diisocyanate) (hydrogenated MDI), 2,6-tolyene diisocyanate (TDI), and isophorone diisocyanate (IPDI). Also, mixtures and prepolymers thereof can be used.

In some embodiments, it can be preferred to use an aromatic polyisocyanate, such as 4,4'-methylene diphenyl diisocyanate (4,4'-MDI), 2,4'-methylene diphenyl diisocyanate (2,4'-MDI), or a mixture and/or prepolymers thereof.

The alkoxysilane functional aspartate ester (c) is a Michael addition product of an amino-functional silane (e.g. alkoxysilane functional amine such as N-(trialkoxysilylalkyl) amine) and an unsaturated diester such as a dialkyl maleate.

The aminofunctional silane preferably has the following general formula:

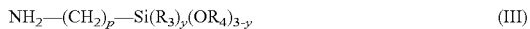

(III)

wherein p is an integer with a value in the range of from 0 to 10, $R_3$ and $R_4$ each are, independently, a C1-C3 alkyl group, y is an integer with a value in the range of from 0-2. Preferably p is an integer with a value in the range of from 1 to 4, more preferably 3 or 4. Preferably, $R_3$ and $R_4$ each are an ethyl group. The aminofunctional silane can for example be N-(monoalkoxysilylalkyl) amine, N-(dialkoxysilylalkyl) amine or N-(trialkoxysilylalkyl) amine. As alkoxy group $OR_4$, methoxy and ethoxy groups are preferred with ethoxy groups particularly preferred.

In a preferred embodiment, the aminofunctional silane is N-(triethoxysilylpropyl) amine, also known as (3-aminopropyl)-triethoxysilane.

The unsaturated diester preferably is a dialkyl maleate or a dialkyl fumarate, more preferably a diester of maleic acid or of fumaric acid and an alkyl alcohol with 1 to 4 carbon atoms, more preferably 1 or 2 carbon atoms. Even more preferably the unsaturated diester is dimethyl maleate or diethyl maleate, still more preferably diethyl maleate. The skilled person is able to find suitable reaction conditions for forming a Michael addition product. Typically, the reaction is exothermic, and the temperature is above room temperature, preferably in the range of from 40 to 100° C., more preferably of from 40 to 80° C.

The alkoxysilane functional aspartate ester (c) is preferably an aspartic acid, N-[3-(triethoxysilyl)propyl]-, dialkyl ester (further referred to herein as APTES-asp), even more preferably aspartic acid, N-[3-(triethoxysilyl)propyl]-, diethyl ester.

The reaction components (a), (b), and (c) and any further diol can be added one after another, or simultaneously. Preferably, the alkoxysilane functional thioether diol (a) is mixed with the alkoxysilane functional aspartate ester (c), to which mixture the polyisocyanate (b) is added. The alkoxysilane functional aspartate ester (c) may be formed by Michael addition in-situ by adding the aminofunctional silane and the unsaturated diester to alkoxysilane functional thioether diol (a), before adding polyisocyanate (b).

Suitable reaction conditions for forming the polyurethane-urea compound by polymerization are generally known to the skilled person. The reaction temperature can be in the range 40-160° C., preferably in the range 50-100° C. Conventional catalysts can be used such as dibutyl tin dilaurate (DBTDL), 1,4-diazobicyclo[2.2.2]octane (DABCO), Zn acetylacetonate (Zn ACAC), tin octoate. The amount of catalyst is preferably from 0.005 to 1 part by weight per 100 parts by weight of the reaction components (urethane forming monomers). Suitable solvents can be used such as n-butyl acetate, N-methyl-pyrrolidone, toluene, and the like.

The polyurethane-urea according to the invention can contain at least 2.5 wt. % Si, or in some embodiments at least 4 wt. % Si, or at least 5 wt. % Si. In yet other embodiments, the polyurethane-urea contains at most 8 wt. % Si, or at most 7 wt. % Si. The Si content can be determined by calculation based on the amounts of the reagents and their (calculated) Si content.

The polyurethane-urea according to the present disclosure can have a number average molecular weight Mn of at least 1,500, or at least 2,000. In some embodiments, the Mn can be less than 10,000, or less than 6,000, or less than 4,000. Also, the weight average molecular weight Mw can be less than 10,000, or less than 6,000, or less than 4,000. Molecular weights Mn and Mw are measured by gel permeation chromatography (GPC) analysis with tetrahydrofuran (THF) as eluent (1 ml/min) on a styrene-divinylbenzene column combination, using polystyrene standards for calibration.

The viscosity of the polyurethane-urea is preferably less than 150 Pa·s, preferably less than 100 Pa·s, in some embodiments even as low as less than 20 Pa·s at 23° C. Viscosity is measured by Brookfield CAP2000+ viscometer, spindle 6, speed 20 rpm at 23° C. The viscosity is measured for the pure polyurethane-urea resin, hence 100% nonvolatile content.

The resulting polyurethane-urea contains alkoxysilyl groups and can react with water. Therefore, the polyurethane-urea can be used in preparation of an adhesive or coating composition that cures upon contact with water.

The adhesive composition or coating composition comprising the polyurethane-urea is preferably isocyanate- and formaldehyde-free. This means that it contains less than 0.1 wt. % of isocyanates and/or formaldehyde, more preferably 0 wt. %, based on the total weight of the composition.

The adhesive composition or coating composition comprising the polyurethane-urea can further comprise a catalyst for the reaction of alkoxysilyl groups with water. Such catalysts are known to the skilled person. Suitable catalysts are for example metal salts (e.g. zirconium nitrate, aluminium chloride), metalorganic compounds, particularly organotin compounds (e.g. dibutyltin dilaurate, dibutyltin acetoacetonate), acids and bases such as tertiary amines (e.g. triethylamine, triethyleneamine or 2,2'-diazabicyclo[2.2.2] octane (DABCO)). Reference herein to acids is to Brønsted acids and Lewis acids. Examples of acidic catalysts include sulfonic acids and its derivatives, e.g. methane sulfonic acid, 1-propane sulfonic acid, 1-pentane sulfonic acid, dodecylbenzene sulfonic acid, p-toluene sulfonic acid. In some embodiments, it can be preferred to use an acidic catalyst, particularly a sulfonic acid or its derivative, more particularly p-toluene sulfonic acid. Other examples of suitable acidic catalysts are sulfamic acid as well as N-substituted derivatives thereof, such as N-butyl, and N-cyclohexyl. The synthesis of useful N-substituted sulfamic acids is described in C. R. L Hack et al.; N-alkylated sulfamic acid derivatives as organocatalyst in multicomponent synthesis of fatty dihydropyrimidinones; J. Braz. Chem. Soc. Vol. 29, no. 11, Sao Paulo, November 2018; link: https://www.scielo.br/scielo.php?script=sci_arttext&pid=S0103-50532018001102342. Still further suitable acidic catalysts are sulfamic acid based ionic liquids. These are described in D. Dupont et al.; New metal extractants and super-acidic ionic liquids derived from sulfamic acid; Chem. Comm., 2016, 52, 7032-7035.

In some embodiments, the adhesive composition or coating composition is a one-component (1K) composition. "One-component" means that all components are maintained and stored in the same container after manufacture and have a reasonable shelf life in this state. Such composition is preferably free of organic solvent and water-free and contains a catalyst for the reaction with water. The composition can then cure after contact with moisture, e.g. from the air.

In other embodiments, the adhesive composition or coating composition is a two-component (2K) composition. "Two-component" means that it is provided in the form of two components, which are stored in separate containers after manufacture, and which are only mixed shortly before the application. Such two-component composition comprises a first component containing the polyurethane-urea. The first component is preferably water-free, and the second component comprises preferably comprises water. The optional catalyst can be present in either of the components. Preferably the catalyst is present in the second component, together with water.

One of the advantages of the polyurethane-urea of the present disclosure is that it has sufficiently low viscosity itself (such as less than 150 Pa·s at 23° C.) so that it can be used without addition of organic solvents or water. This makes it possible to create a so called "100% solid" adhesive or coating composition or a "100% solid" first component in case of a two-component coating composition. This is desirable in view of reducing VOC (volatile organic content) emissions. "100% solid" means that the non-volatile content of the component containing the polyurethane-urea is 100 wt. %.

The amount of the polyurethane-urea in the adhesive composition or coating composition is preferably at least 25 wt. %, or at least 30 wt. % and more preferably at least 35 wt. % of the total weight of the composition. Generally, the amount would be 100 wt. % or less, preferably less than 95 wt. % of the total weight of the adhesive composition or coating composition.

The adhesive composition or coating composition can further comprise conventional additives, such as defoamers, rheology modifiers, pH stabilizer, flow agents, levelling agents, wetting agents, matting agents, antioxidants, emulsifiers, stabilizing agents, inhibitors, catalysts, thickeners, thixotropic agents, impact modifiers, process aids, and mixtures of the aforementioned additives. The amount of each of such additives is preferably from 0.01 to 25 wt. %, more preferably 0.05 to 15 wt. %, most preferably 0.1 to 10 wt. %, based on the total weight of the coating composition. Also, fillers known to the skilled person can be used. Typically, the filler content can be up to 35 wt. % based on the solid content of the composition.

The adhesive composition or coating composition can be applied to at least a part of a substrate by methods known in the art. Such methods include, for example, spray coating, spread coating, flood coating, casting, dip coating and roll coating. The skilled person is able to find suitable conditions for application and curing of the composition. The adhesive composition or coating composition can be cured at ambient temperature or at elevated temperature. In some embodiments, it is preferred to cure at ambient temperature (15-30° C.). In other embodiments, elevated temperatures (e.g. 70-100° C.) can be used.

Substrates can be wood, wood-containing composites, metals, plastics, paper, stone, glass, concrete. Preferably, the substrate is wood or a wood-containing composite. In some embodiments, the adhesive composition or coating composition is used on non-porous substrates such as metal, plastics and glass.

In one embodiment, the polyurethane-urea according to the first aspect of the invention is used in an adhesive composition. The invention provides in a third aspect a method of bonding a first substrate to a second substrate, comprising applying the adhesive composition to at least one surface of the first substrate or the second substrate, and contacting a surface of the first substrate with a surface of the second substrate, where at least one of the contacting surfaces has the adhesive applied thereto.

The polyurethane-urea according to the first aspect of the invention can also be advantageously used in a coating composition. The inventors have found that the coating comprising the polyurethane-urea of the invention particularly well adheres to non-porous substrates such as metal, plastics or glass. It was not possible to peel off the cured film from glass, even after prolonged soaking in water (4 days). The coating also adheres well to porous substrates such as wood or a wood-containing composite. The coating formed is clear and barely visible. It appears unmodified even after soaking in water (4 days). It also shows nearly no weight loss in water (<1 wt. %). The coating is also very strong as it bends the wood panel during soaking in water, even in the short direction.

The invention relates in a fourth aspect to a substrate bonded with the adhesive composition or coated by the coating composition according to the second aspect of the invention. The substrate can be wood, wood-containing composite, metal, plastics, paper, stone, glass or concrete.

The invention will now be illustrated by the following non-limiting examples. The percentages and parts are by weight, unless otherwise specified.

EXAMPLES

Example 1

Synthesis of APTES-asp

In a 2 liter three-necked flask, dried to exclude moisture, equipped with a mechanical stirrer, a thermocouple and a cooler, 656.78 g (3.81 mol) diethyl maleate was weighed in under nitrogen. Then 843.23 g (3.81 mol) 3-aminopropyl triethoxysilane (Dynasylan AMEO-T from Evonik) was dosed via a dropping funnel. This was an exothermic reaction and the temperature increased during the addition to 79° C. After 40 min all 3-aminopropyl triethoxysilane was dosed and the temperature was kept on 70° C. until the conversion was above 95% (as determined by $^1$H-NMR (CDCl$_3$)) and then stopped. This was after 24 hours. The product is heated again, poured out in a glass jar and kept under nitrogen. The product is slightly yellow.

Example 2

Synthesis of a Polyurethane-Urea According to the Invention

Synthesis of Alkoxysilane Functional Thioether Diol

In a 500 ml three-necked flask, equipped with a mechanical stirrer, a thermocouple and a cooler, 157.85 g (0.635 eq) of (3-mercaptopropyl)triethoxysilane was added to 63.97 g (0.316 eq) of 1,4-butanediol diglycidyl ether and 0.5 g (0.002 eq) of 2,4,6-tris(dimethylaminomethyl)phenol (DMP30) under nitrogen. The mixture was stirred at 50° C. and the reaction was followed by epoxy titration until 95% conversion.

Synthesis of Polyurethane-Urea 248.7 g (0.633 eq) of APTES-asp prepared in Example 1 was added to the synthesized alkoxysilane functional thioether diol at 50° C., after which 161.5 g (0.633 eq) of methylene diphenyl diisocyanate (a mixture of 4,4'-MDI, 2,4'-MDI, and 2,2-MDI in a 66/32/2 ratio) was dosed to the mixture in 10 minutes. The temperature was increased to 80° C. and the reaction allowed to proceed for 2 hours. The reaction was followed by % NCO content and stopped when NCO content was less than 0.1%. The mixture was stored in a sample jar under nitrogen atmosphere.

The resulting polyurethane-urea contains 5.7% Si, has molecular weight Mn 1017, Mw 1470 as determined by GPC. The viscosity is 11.5 Pa·s at 23° C.

Example 3

Synthesis of Alkoxysilane Functional Thioether Diol

In a 250 ml three-necked flask, equipped with a mechanical stirrer, a thermocouple and a cooler, 47.74 g (0.2 mol) of (3-mercaptopropyl)triethoxysilane was added to 20.26 g (0.1 mol) of 1,4-butanediol diglycidyl ether and 0.2 g (0.0008 mol) of 2,4,6-tris(dimethylaminomethyl)phenol (DMP30) under nitrogen. The mixture was stirred at 50° C. and the reaction was followed by epoxy titration until 95% conversion.

Synthesis of Polyurethane-Urea

To the synthesized alkoxysilane functional thioether diol was added 34.49 g (0.2 mol) diethyl maleate under nitrogen. Then, 44.26 g (0.2 mol) 3-aminopropyl triethoxysilane (Dynasylan AMEO-T from Evonik) was dosed via a dropping funnel. This was an exothermic reaction and the temperature increased during the addition to 70° C. After 20 minutes all 3-aminopropyl triethoxysilane was dosed and the temperature was kept on 70° C. until the conversion was above 95% (as determined by $^1$H-NMR (CDCl$_3$)) and then stopped. This was after 24 hours. The product is slightly yellow.

Then, 51.12 g (0.2 mol) of methylene diphenyl diisocyanate (a mixture of 4,4'-MDI, 2,4'-MDI, and 2,2-MDI in a 66/32/2 ratio) was dosed to the mixture in 50 min. The temperature was increased to 80° C. and reaction allowed to proceed for 2 hours. The reaction was followed by % NCO content and stopped when NCO content was less than 0.1%. The mixture was stored in a sample jar under nitrogen atmosphere.

The resulting polyurethane-urea contains 5.7% Si, has molecular weight Mn 1162, Mw 2382 as determined by GPC. The viscosity is 47.6 Pa·s at 23° C.

Example 4

Synthesis of a Comparative Polyurethane-Urea

In a dried three-necked reaction flask equipped with a mechanical stirrer, a thermocouple, a cooler and under a nitrogen flow, 7.77 g polypropylene glycol with a molecular weight of 1,000 (PPG1000) (0.01 eq), 13.3 g polypropylene glycol with a molecular weight of 2,000 (PPG2000 (0.01 eq), 11.7 g 4,4'-MDI (0.09 eq) and 25 g APTES-asp prepared in Example 1 (0.06 eq) are weighted in. The mixture is stirred and slowly heated to 80° C. The conversion is followed by NCO titration. The reaction was stopped at NCO<0.1%.

The resulting polymer contains 3.1% Si, has a number average molecular weight Mn 1803 as determined by GPC and viscosity of 100 Pa·s at 23° C.

Example 5

Adhesive Compositions

Adhesive compositions were formulated according to Table 1. All parts are by weight.

The pure resin and adhesive compositions prepared above were used to prepare glue-ups with beech panels. Glue-ups, sample preparation and evaluation were performed according to European standard EN 302-1:2013 with the test requirements listed in EN 16254:2013. In the procedure the shear strength of adhesive bonds is determined by applying a longitudinal tensile force to thin glue lines (0.1 mm) between two rectangular wooden adherends made of beech. The assembly time was less than 5 min, press time was 15 minutes and the applied pressure was 5 kg/cm$^2$ for the resins and adhesives compositions with pTSA as catalyst. The assembly time was less than 5 min, press time was 20 hours and the applied pressure was 2.5 kg/cm$^2$ for the resins and adhesives compositions with sulfamic acid as catalyst. In all cases the glue amount was 160 g/m$^2$ (double-sided application). The adhesive compositions were glued twice and then evaluated for dry adhesion (test A1) and water resistance (test A2) according to EN 302-1 tests:

Treatment A1—no treatment other than conditioning in standard climate [20° C./65% relative humidity].

Treatment A2—after conditioning in standard climate, 4 days soaking in cold water at 20° C., the samples are tested in wet state.

After treatment A1 or A2, the mean tensile shear strength of the glue joint is measured (N/mm$^2$) and the results are shown in Table 3. Pure resins were also tested. For test A1, values above 6 N/mm$^2$ are considered good results. For test A2, values above 3 N/mm$^2$ are considered good results.

TABLE 1

Resin and adhesive compositions

| | Pure resin | | Adhesive | | Pure resin | | Adhesive | |
| --- | --- | --- | --- | --- | --- | --- | --- | --- |
| | Ra* | R1 | Aa* | A1 | Rb* | R2 | Ab* | A2 |
| Comparative polyurethane-urea of Example 3 | 90.91 | — | 74.07 | — | 90.91 | — | 74.07 | — |
| Polyurethane-urea of Example 2 | — | 90.91 | — | 74.07 | — | 90.91 | — | 74.07 |
| Fumed silica (Aerosil200) | — | — | 1.39 | 1.39 | — | — | 1.39 | 1.39 |
| Kaolin | — | — | 8.33 | 8.33 | — | — | 8.33 | 8.33 |
| Water | 8.64 | 8.64 | 15.84 | 15.84 | 7.73 | 7.73 | 15.10 | 15.10 |
| p-toluene sulfonic acid (pTSA)** | 0.45 | 0.45 | 0.37 | 0.37 | | | | |
| Sulfamic acid** | | | | | 1.36 | 1.36 | 1.11 | 1.11 |

*comparison example
**the weight ratio of the PTSA to the resin and of sulfamic acid to resin is the same for all compositions

TABLE 2

Mechanical properties of resin and adhesive compositions

| | Test A1 | | Test A2 |
| --- | --- | --- | --- |
| | Tensile shear strength, N/mm$^2$ | Average wood failure, % | Tensile shear strength, N/mm$^2$ |
| Pure resin compositions | | | |
| Ra* | 9.18 | 11 | 1.2 |
| R1 | 10.33 | 47 | 2.18 |

TABLE 2-continued

Mechanical properties of resin and adhesive compositions

| | Test A1 | | Test A2 |
|---|---|---|---|
| | Tensile shear strength, N/mm² | Average wood failure, % | Tensile shear strength, N/mm² |
| Rb* | 8.21 | 30 | 0.91 |
| R2 | 10.77 | 100 | 2.73 |
| Adhesive compositions | | | |
| Aa* | 8.53 | 83 | 1.78 |
| A1 | 8.46 | 71 | 3.79 |
| Ab* | 9.58 | 50 | 1.91 |
| A2 | 11.14 | 100 | 3.88 |

*comparison example

Average wood failure (%) was also determined after the wood panels were pulled apart (into two pieces) in the tensile testing machine. Wood failure is estimated as the percentage of the glue surface that is covered with wood fiber from the other panel. Then the average value is taken of two measurements. Wood failure is indicative of how strong the glue is compared to the wood. If the wood failure % is high, this means that the glue is stronger than the wood and the wood is the weakest part. During pulling the glued panels apart, the wood breaks earlier than the glue line. If the wood failure % is low, this means that the glue line breaks first so that the glue line is the weakest part of the glued assembly.

When pTSA is used as catalyst, the results show that for the pure resin compositions, the composition of the invention has a higher tensile shear strength in the dry adhesion test A1 than the comparative polyurethane-urea. In dry adhesion test A1, both the comparative and inventive adhesive compositions show a lower (but still very good) tensile shear strength compared to pure resins. However, high wood failure for the adhesive compositions indicates that the wood breaks earlier than the adhesive. Hence, the dry adhesion is excellent, both for the inventive and comparative compositions.

When sulfamic acid is used as catalyst, both the comparative and inventive adhesive compositions show a slightly higher tensile shear strength in dry adhesion test A1 compared to the pure resins. The dry adhesion is much better for the inventive compositions than for the comparison examples.

The results of the wet resistance test A2 show that the compositions according to the invention have a considerably higher tensile shear strength.

Example 6

Acid Curing Coating Compositions

The resins from Example 2 and 4 have been evaluated in acid curing coating compositions including the resin, a diluent and a hardener (catalyst). The compositions were formulated according to Table 3. All parts are by weight.

TABLE 3

Coating compositions

| | A* | B |
|---|---|---|
| Comparative polyurethane-urea of Example 4 | 100 | — |
| Polyurethane-urea of Example 2 | — | 100 |
| Butyl acetate | 30 | 30 |
| Hardener** | 2.5 | 2.5 |

*comparative composition,
**5% solution of p-toluene sulphonic acid

The coating compositions were applied to pine and glass substrates. Pendulum hardness was measured using Erichsen Pendulum Damping Tester Model 299/300, according to ISO1522. Pendulum hardness as Konig hardness was measured for a 120 μm wet film 24 h and 1 week after application. The number of oscillations needed to reduce from an initial deflection of 6° to a deflection of 3° was measured.

Also, adhesion to pine (both dry and wet) has been tested as well as blushing after soaking in water. Dry adhesion is tested according to a cross-cut test, ISO standard 2409:2013, 120 μm wet film and drying for 1 week at 40° C. Wet adhesion was tested in the same way, where the applied film was first dried for 1 week at 40° C. and then soaked for 2 h in water before the adhesion test was performed. Adhesion is graded from 0 (best) to 5 (worst). After the wet adhesion conditioning, also blushing was assessed. Results are shown in Table 5.

TABLE 4

Properties of coating compositions

| | Pendulum hardness[a] | | Dry adhesion to pine | Wet adhesion to pine | Blushing |
|---|---|---|---|---|---|
| | 24 h at 40° C. | 1 week at 40° C. | | | |
| A | 38 | 39 | 0 | 0 | No issues |
| B | 85 | 136 | 0 | 0 | No issues |

[a]number of oscillations needed to reduce from an initial deflection of 6° to a deflection of 3°

The results in Table 4 show that both resins (comparative of Example 4 and inventive of Example 2) are highly reactive and only need a small amount of hardener (corresponding to 0.5% of p-toluene sulfonic acid). The pendulum hardness of the inventive acid-curing composition (B) was considerably higher than of the comparative acid-curing composition (A). Both dry and wet adhesion to pine are excellent, as well as there was no blushing observed.

The invention claimed is:

1. An alkoxysilane functional polyurethane-urea obtainable by polymerization of reaction components comprising:
    (a) an alkoxysilane functional thioether diol;
    (b) a polyisocyanate; and
    (c) an alkoxysilane functional aspartate ester,
    wherein the alkoxysilane functional aspartate ester (c) is a Michael addition product of an amino-functional silane and an unsaturated diester.

2. The polyurethane-urea according to claim 1, wherein the alkoxysilane functional thioether diol (a) is obtainable by reacting an epoxy-difunctional compound with a mercaptoalkyl alkoxysilane.

3. The polyurethane-urea according to claim 2, wherein the epoxy-difunctional compound is a diglycidyl ether selected from the group consisting of ethylene glycol diglycidyl ether, diethylene glycol diglycidyl ether, 1,4-butanediol diglycidyl ether, 1,6-hexanediol diglycidyl ether, poly(ethylene glycol) diglycidyl ether, and combinations thereof.

4. The polyurethane-urea according to claim 1, wherein the reaction components comprise a further diol.

5. The polyurethane-urea according to claim 1, wherein the unsaturated diester is a dialkyl maleate or a dialkyl fumarate.

6. The polyurethane-urea according to claim 5, wherein the unsaturated diester is diethyl maleate.

7. The polyurethane-urea according to claim 1, wherein the alkoxysilane functional aspartate ester (c) is an aspartic acid, N-[3-(triethoxysilyl) propyl]-, dialkyl ester.

8. A composition comprising the polyurethane-urea according to claim 1, wherein the composition is an adhesive composition or a coating composition.

9. The composition according to claim 8, wherein the composition is a two-component composition comprising:
a first component which is free of water and contains the polyurethane-urea according to claim 1; and
a second component comprising water and a catalyst for reacting polyurethane-urea with water.

10. The composition according to claim 8, wherein the composition is a one-component, moisture-curing composition, and wherein the composition further contains a catalyst for reacting polyurethane-urea with water.

11. The composition according to claim 9, wherein the catalyst is selected from the group consisting of metal salts, metalorganic compounds, acids, and bases.

12. A method of bonding a first substrate to a second substrate, comprising applying the composition according to claim 8 to at least one surface of the first substrate or the second substrate, and contacting a surface of the first substrate with a surface of the second substrate, wherein at least one of the contacting surfaces has the composition applied thereto; and wherein the composition is an adhesive composition.

13. A substrate bonded with the adhesive composition or coated with the coating composition according to claim 8.

14. The substrate according to claim 13, wherein the substrate is wood, wood-containing composite, metal, plastics, paper, stone, glass or concrete.

* * * * *